United States Patent [19]

Tetzlaff et al.

[11] Patent Number: 4,620,902

[45] Date of Patent: Nov. 4, 1986

[54] ELECTROLYSIS PROCESS USING LIQUID ELECTROLYTES AND POROUS ELECTRODES

[75] Inventors: Karl-Heinz Tetzlaff, Kelkheim (Taunus); Dieter Schmid, Schwalbach/Taunus; Jürgen Russow, Kelkheim (Taunus), all of Fed. Rep. of Germany

[73] Assignee: Hoechst Aktiengesellschaft, Fed. Rep. of Germany

[21] Appl. No.: 692,301

[22] Filed: Jan. 17, 1985

[30] Foreign Application Priority Data

Jan. 19, 1984 [DE] Fed. Rep. of Germany ....... 3401638

[51] Int. Cl.⁴ ............................ C25B 1/00; C25F 5/00
[52] U.S. Cl. ................................. 204/1 R; 204/59 R; 204/98; 204/130
[58] Field of Search ................. 204/1 R, 59 R, 60, 95, 204/98, 128, 129, 130

[56] References Cited

U.S. PATENT DOCUMENTS

| | | | |
|---|---|---|---|
| 3,496,077 | 2/1970 | Cooper | 204/98 |
| 3,945,892 | 3/1976 | James et al. | 204/1 R |
| 4,013,525 | 3/1977 | Emsley | 204/98 |
| 4,138,295 | 2/1979 | DeNori et al. | 204/98 |
| 4,430,176 | 2/1984 | Davison | 204/284 |
| 4,444,631 | 4/1984 | Bommaraju et al. | 204/98 |

*Primary Examiner*—Terryence Chapman
*Attorney, Agent, or Firm*—Connolly and Hutz

[57] ABSTRACT

This process can be carried out in an electrolytic cell which is non-partitioned or partitioned by at least one separator and has at least one porous electrode. The electrolyte enters parallel to the surface of the electrode and is forced by at least one restriction point to flow through the porous electrode parallel to the flow of charge.

6 Claims, 9 Drawing Figures

ELECTROLYSIS PROCESS USING LIQUID ELECTROLYTES AND POROUS ELECTRODES

The invention relates to a process for the electrolysis of liquid electrolytes by means of porous electrodes in partitioned or non-partitioned electrolytic cells. The process is suitable for reactions which evolve gas and for reactions which do not evolve gas. It can be used with electrolytes of high conductivity and low conductivity, for example in the electrolysis of alkali metal chlorides and in the removal of toxic metal salts in the ppm range.

As is known to anyone skilled in the art, the overvoltage at an electrode is a function of the current density. Attempts are therefore made to employ electrodes having a large surface area, for example perforated or porous electrodes.

If the electrolyte has a high conductivity, the electrodes are frequently immersed in the electrolyte and are wetted on both sides or they are subjected to the electrolyte only on one side. However, the large surface area of porous electrodes can thereby only be utilized in part, because differences in concentration build up as a result of the reaction, and the exchange of material is limited.

If the electrolyte has a low conductivity, solid bed electrolyzers, such as are described, for example, in Chem.-Ing.-Techn. 55 (1983) No. 1, pages 23–30, are frequently employed. In partitioned cells the electrolyte is allowed to flow through a thick electrode of coarse pores perpendicularly to the flow of charge. When the electrode material is utilized in an optimum manner, this results, under conditions of limiting flow, in an electrode which becomes thicker in the direction of flow. Adjusting or indeed optimizing the space-time yield by controlled variation of the flow rate within the electrode can only be effected by altering the width of the electrode. This is technically unsatisfactory. A further disadvantage is the obligatory coupling of electrolyte flow and conversion, which requires a very exact design. As a result of the long path of flow, the solid bed cell described is limited to relatively coarse particles.

The object of the invention therefore consists in making better use of the internal surface area of porous electrodes and avoiding the disadvantages described.

An electrolysis process for partitioned and non-partitioned cells having at least one porous electrode is therefore proposed, wherein the electrolyte enters parallel to the electrode surface and is forced by at least one restriction point to flow through the porous electrode at least partially parallel to the flow of charge.

In accordance with a further embodiment of the invention, the electrolyte can also be forced by several restriction points to flow at least partially parallel to the flow of charge several times. The distances between the restriction points in this embodiment can be so chosen that the electrolyte flows through electrodes of ever-narrowing cross-section or ever-widening cross-section. The electrolyte can also be forced, on its flow path, to flow through sections of electrode having different properties, for example through thicker sections of electrode or electrode sections having a different pore size.

A further advantageous embodiment of the invention, which is also suitable for reactions evolving gas, consists in the electrolyte, after flowing through the porous electrode, flowing down at the surface in a thin layer under the action of gravity and forming a phase boundary to a gas space. As it flows down, the electrolyte can at the same time wet a perforated counter-electrode. In this way, gas bubbles formed at this counter-electrode can give up their gas content by a short route to the immediately adjacent gas space. In order that the flow through the porous electrode should be as uniform as possible, the pressure drop should be many times the hydrostatic pressure.

Porous electrodes are to be understood as meaning electrodes having a large internal surface area, for example piled particles, loose or compressed fiber fleeces or grids which can lie one on top of another in several layers. Porous electrodes are also known by the name "gas diffusion electrodes". Electrodes of this type can also assume the function of a diaphragm as a result of the special layer construction. The electrodes can be flat or curved. The electrolytic cells can be non-partitioned or can be partitioned by separators, such as, for example, ion exchange membranes or diaphragms. The process can be operated with various counter-electrodes, specifically with perforated, solid and porous electrodes. The arrangement of the electrodes within the space and the direction of flow of the entering electrolyte can be of any desired type.

For reactions which evolve gas, it is preferable to have only one restriction point, so that the gas and the electrolyte pass into the rear space behind the electrode. It is particularly advantageous in this case if the electrolyte can be withdrawn at the lower end of the electrode. A falling film which contains bubbles and which flows down in a thin layer under the action of gravity is then formed on the rear side of the porous electrode. The electrolyte can, however, also be allowed to flow from the rear side to the front side. If, in this case, a perforated electrode is arranged as the counter-electrode at a short distance from the front side of the porous electrode, here too the electrolyte can flow freely downwards while wetting both electrodes. A vertical arrangement of electrodes is to be preferred in layouts having a free falling film, but any layout having an angle to the horizontal of between 1 and 179 degrees is also possible. The space behind the porous electrode or the perforated electrode is to receive not only the electrolyte flowing down in a thin layer, but also the gas formed. This gas space forms a common phase boundary with the downward flowing electrolyte. In large electrolytic cells, the gas space itself need only be a few millimeters deep. This arrangement can also be used for reactions in which there is no evolution of gas, by introducing an extraneous gas into the electrolytic cell. Compact bipolar arrangements without bipolar separating walls can be constructed in this manner, since the narrow gas space acts as an insulator.

In many cases partitioned cells are used in order to prevent the products formed from reaching the counter-electrode. If the process according to the invention is used, however, it is possible to dispense with this expensive mode of construction. It is possible in this case to employ non-partitioned cells in which at least one porous electrode is employed, the flow through which is in a direction parallel to the transport of charge. The flow through the porous electrode takes place substantially free from back-mixing. The dwell time of the electrolyte in the active layer of the porous electrode can be made extremely small by suitably choosing the layer thickness and the flow rate. This enables undesirable side reactions to be suppressed effectively.

Electrolyzers according to the process proposed only differ slightly from the state of the art in their fundamental design. Many electrolyzers can, therefore, be converted in a simple manner by adding restriction strips. The conversion from solid electrodes to porous electrodes is also certainly advantageous in many cases. Advantage can be taken of this to save energy and to increase the space-time yield. The process also results in a saving of electrode material, since a greater surface area becomes usable per unit of mass. This also applies particularly to dilute solutions of electrolyte operating under conditions of limiting current. In this case the space-time yield of the electrode can be increased considerably by decreasing the diameter of the pores or of the particles.

The electrolyte throughput and the conversion can be matched to one another in a simple way through the number of restriction points. Subsequent adjustment to changed requirements is also readily possible. Optimization of the flow rate in order to save further energy can be accomplished easily by selecting different distances between the restriction points at a constant electrode surface area.

The invention is illustrated in greater detail using, as examples, FIGS. 1 to 9. The diagrams are greatly simplified and in some cases only show sections of cell stacks; in some cases only a half-cell layout is outlined. The flow of electrolyte is indicated by arrows.

BRIEF DESCRIPTION OF THE DRAWINGS

FIG. 1 shows a porous electrode 3 which is enclosed by two side walls 2 and 11. These side walls are intended to represent a further electrode or a separator or a casing wall, such as, for example, a so-called bipolar separator. In FIG. 1 the electrolyte 1 enters from below between the side wall 11 and the porous electrode 3. As a result of the transversely arranged strip-shaped restriction points 5, the electrolyte is forced to flow transversely through the porous electrode 3, i.e. parallel to the transport of charge. In order to absorb the compressive forces acting on the porous electrode, it is expedient to mount distance pieces on both sides of the porous electrode; these distance pieces are known per se in electrolysis processes and are therefore not illustrated here. The restriction points 5 can restrict the stream of electrolyte partly or wholly.

FIG. 2 shows a half-cell having a separator 6 and a so-called bipolar separator 8 between which a porous electrode 3 of varying thickness is located. The stream of electrolyte 1 entering from below is deflected several times by restriction points 5. In this case the restriction points 5 are so constructed that they also screen off the individual sections of electrode. The arrangement is preferentially suitable for very dilute electrolytes.

FIG. 3 shows a half-cell layout having a separator 6 and a bipolar separator 8 between which a porous electrode 3 is located. The electrolyte 1 flowing in from below meets only one restriction point 5, so that the electrolyte 1 flows through the porous electrode 3 in a single pass. The restriction points shown are to be understood as symbols. The structure can, for example, be designed in such a way that, although the space between the separator 6 and the porous electrode 3 has an inflow, it does not have an outflow, and the space between the porous electrode 3 and the bipolar separator 8 only has an outflow and no inflow.

FIG. 4 shows the same arrangement as FIG. 3, but turned upside down. The electrolyte 1 now flows from above into the space between the separator 6 and the porous electrode 3. As the result of a decreasing amount of electrolyte, the distance between the porous electrode 3 and the separator 6 can decrease toward the bottom. The lower restriction point 5 forces the electrolyte to flow through the porous electrode 3 parallel to the transport of charge. If it is then arranged that the electrolyte 1 can flow out freely from the space between the porous electrode 3 and the bipolar separator 8, a falling film which can flow out downwards in a thin layer through the action of gravity is formed on the rear side of the porous electrode 3. This arrangement is preferentially suitable for reactions which evolve gas. The gas bubbles formed pass, from the falling film as it flows down, by a short path to the phase boundary at the immediately adjacent gas space 10 and there liberate their gas content by bursting. By means of a suitable arrangement of the layers in its porous structure, the porous electrode 3 should preferably release the resulting gases on its rear side.

FIG. 5 shows a section of FIG. 4, but with an additional diaphragm 7. This shows the detail of the falling film of electrolyte, with the gas bubbles 9, flowing downwards at the rear side of the porous electrode 3. As stated above, the diaphragm 7 shown can be an integral part of the porous electrode 3.

FIG. 6 shows a section of a non-partitioned single-pole stack of cells. The arrangement comprises porous electrodes 3 and perforated counter-electrodes 4. The electrolyte 1 entering from above is forced by the lower restriction point 5 to flow through the porous electrodes 3. It thus comes into contact with the perforated counter-electrode 4 which is located a short distance away. If—as already described similarly in FIG. 4—arrangements are made for the electrolyte to flow out freely, it can flow down under the action of gravity with the formation of a phase boundary at an immediately adjacent gas space 10. The gas space 10 is closed at the top by the upper restriction point 5. The arrangement is preferentially suitable for reactions in which a gas is formed at the perforated electrode 4 or at the porous electrode 3. The gas can be removed together with the electrolyte.

FIG. 7 shows a section of a non-partitioned stack of cells with single-pole connections, a porous electrode 3 and an electrode 4 which has a solid structure. Both sides of the electrode 4 are used as a working surface. The electrolyte 1 enters from below between two porous electrodes 3 and is deflected several times on its way by the restriction points 5.

FIG. 8 shows a section of a non-partitioned stack of cells which has bipolar connections and operates only with porous electrodes 3 and 4. In order to prevent a short circuit on the electrolyte side, bipolar separators 8 are located between each cell unit. The restriction points 5 located in this region can be electron conductors. The restriction points 5 between two operating electrodes must, of course, be insulators. On its way, the electrolyte 1 entering from below between the operating electrodes is deflected several times by restriction points 5 in the manner identified.

FIG. 9 shows a section of a non-partitioned stack of cells with single-pole connections, a porous electrode 3 and a porous counter-electrode 4. To make them more readily distinguishable, the electrodes have been given voltage symbols. The electrolyte 1 entering from below is forced by the upper restriction point 5 to flow through the two porous electrodes 3 and 4 parallel to the transport of charge. The products formed at the anode and at the cathode, labeled 1a and 1b, can be removed separately, substantially unmixed, in order to subject them to suitable working up.

Figure 1:
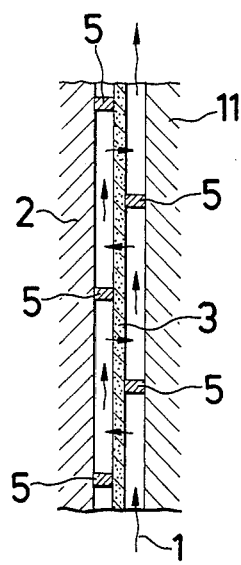
FIG. 1 shows the principle of the combined action of a porous electrode and restriction points.
Figure 2:
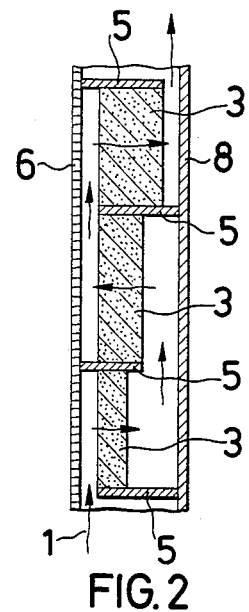
FIG. 2 shows a half-cell layout using a porous electrode of varying thicknesses.
Figure 3:
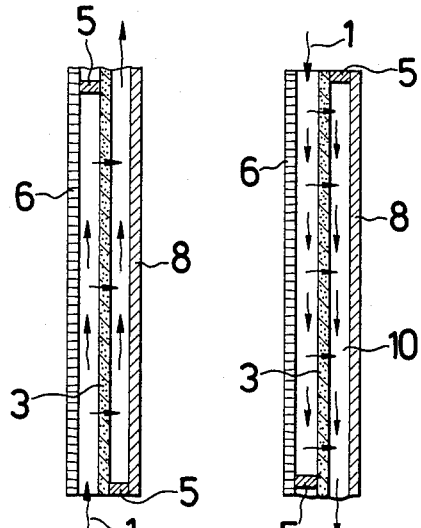
FIG. 3 shows a half-cell layout in which there is a single passage of the electrolyte through the porous electrode.
Figure 4:
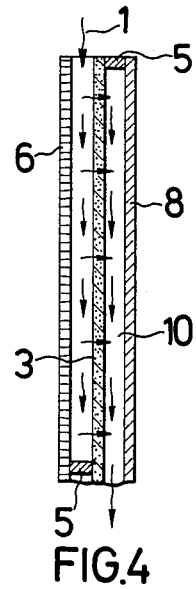
FIG. 4 shows a half-cell layout in which there is free discharge of the electrolyte on the rear side of the porous electrode.
Figure 5:
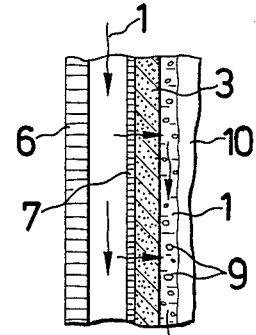
FIG. 5 shows a section of FIG. 4.
Figure 6:
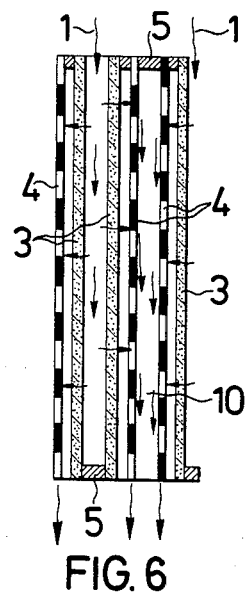
FIG. 6 shows a non-partitioned stack of cells with single-pole connections, a porous electrode and a perforated counter-electrode.
Figure 7:
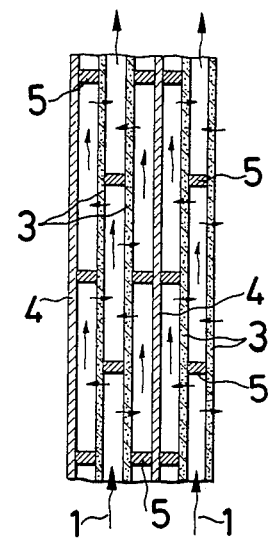
FIG. 7 shows a non-partitioned stack of cells with single-pole connections, a porous electrode and a solid counter-electrode.
Figure 8:
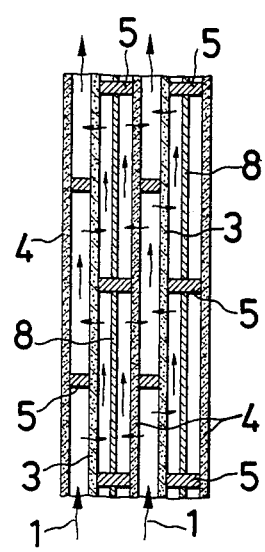
FIG. 8 shows a non-partitioned stack of cells with bipolar connections, a porous electrode and a porous counter-electrode.
Figure 9:
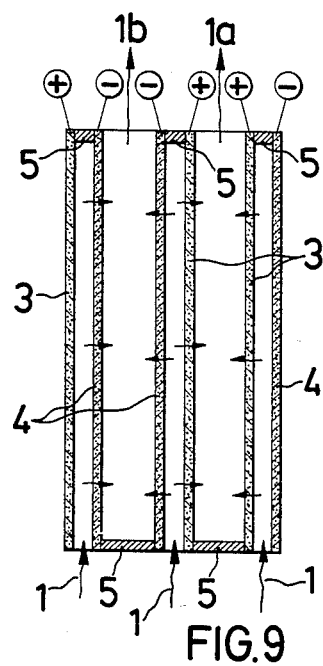
FIG. 9 shows a non-partitioned stack of cells with single-pole connections, a porous electrode and a porous counter-electrode.

We claim:

1. An electrolysis process for liquid electrolytes in a non-partitioned electrolytic cell having at least one porous electrode through which the electrolyte is passed comprising the steps of directing the electrolyte along a path essentially parallel to the surface of the porous electrode, providing a flow restriction point in the path of flow of the electrolyte and forcing the electrolyte to flow from the restriction point through the porous electrode from one side of the electrode to the other along a path essentially parallel to the flow of charge in the electrolysis process which flow of charge is generally perpendicular to the surface of the porous electrode.

2. A process as in claim 1 including the further steps of providing additional restriction points in the path of flow of the electrolyte, and forcing the electrolyte to flow from the additional restriction points through the porous electrode from one side of the electrode to the other along a path essentially parallel to the flow of charge in the electrolysis process.

3. A process as in claim 2 wherein the electrolyte is forced to flow through a porous electrode of ever-increasing cross-section as the electrolyte travels along its flow path.

4. A process as in claim 2 wherein the electrolyte is forced to flow through a porous electrode of ever-decreasing cross-section as the electrolyte travels along its flow path.

5. A process as in claim 2 wherein the electrolyte is forced to flow through sections of a porous electrode having different properties as the electrolyte travels along its flow path.

6. A process as in claim 1 wherein the electrolyte, after flowing through the porous electrode, flows in a downward direction by gravity in a thin layer at the surface of the porous electrode forming a phase boundary to a gas space.

* * * * *